(12) United States Patent
Edlund

(10) Patent No.: US 6,582,529 B1
(45) Date of Patent: Jun. 24, 2003

(54) ARRANGEMENT FOR SEAM PREPARATION

(76) Inventor: Kent Edlund, Elin Wagners gala 29 2 tr, SE-129 51 Hagersten (SE)

( * ) Notice: Subject to any disclaimer, the term of this patent is extended or adjusted under 35 U.S.C. 154(b) by 0 days.

(21) Appl. No.: 09/869,110

(22) PCT Filed: Dec. 16, 1999

(86) PCT No.: PCT/SE99/02381

§ 371 (c)(1),
(2), (4) Date: Jul. 26, 2001

(87) PCT Pub. No.: WO00/40363

PCT Pub. Date: Jul. 13, 2000

(30) Foreign Application Priority Data

Dec. 22, 1998 (SE) ............................................. 9804464

(51) Int. Cl.⁷ .............................................. B23K 10/00
(52) U.S. Cl. ......................................... 148/194; 266/48
(58) Field of Search ............................ 266/48, 77, 51; 82/1.11, 1.2; 148/194

(56) References Cited

U.S. PATENT DOCUMENTS

| 4,143,862 A | 3/1979 | Krieg |
| 4,216,945 A | 8/1980 | Krieg |
| 4,349,182 A | 9/1982 | Blackburn |
| 4,693,761 A * | 9/1987 | Bohm et al. .................. 266/58 |
| 5,778,744 A * | 7/1998 | Braun et al. ................. 82/1.11 |

FOREIGN PATENT DOCUMENTS

| EP | 0 634 247 | 1/1995 |
| FR | 2 676 947 | 12/1992 |

* cited by examiner

Primary Examiner—Scott Kastler
(74) Attorney, Agent, or Firm—Dykema Gossett PLLC

(57) ABSTRACT

The unique in the construction is a number of important components and parts: a) the plate holder in molded aluminium; its double function and shaping in order to be able to be used as both a holder for plates and also serve for transfer of the circular movement to the linear, b) the driving wheel which facilitates the transfer of the circular movement to the plate holder, c) the superstructure which comprises a device for a press roll and also the parallel conveying bar and to make it possible for adjustment of the frictional pressure between the driving wheel and the plate holder, d) adjustment, through engine-driven gear racks, of the plasma gun for the making of holes.

8 Claims, 1 Drawing Sheet

ARRANGEMENT FOR SEAM PREPARATION

BACKGROUND OF THE INVENTION

It is well known that schools for welding, and companies of today use mechanical treatments such as cutting, turning, milling and planning for joint preparation of welding seams. The materials used are stainless steel (alloyed), aluminum and black plate (unalloyed). The teaching of welding can be carried out in such way that the trainee provides samples of plates and/alternatively on pipes and tubes. Seam preparation of plates may be carried out by means of applying the workpiece in a particular machine where use is made of oxygen and acetylene cutting. The method is expensive and time consuming. With respect to scam preparation of pipes/tubes, a number of problems occur. The method is very costly, time-consuming and comprises a number of hazardous operations.

The cutting of the pipe/tube are carried out in a band saw machine, and alternatively by way of cutting wheel.

The pipe/tube are applied to a turning machine for the purpose of chamfering into a correct chamfer angle.

These operations are hazardous with respect to an industrial safety point of view.

BRIEF DESCRIPTION OF THE INVENTION

The purpose with the present invention is to securely prepare seams for plates as well as pipes/tubes in a cost efficient way, and provide a safe working environment.

The purpose of the machine is to provide for seam preparation for plates as well as pipes/tubes in the same machine. The machine is cost saving, decreases and eliminates the risk for injuries, and provides a high quality to the surfaces prepared. By way of using the combined construction of the machine, circular and linear movements, the stepless driving unit, and that in combination with a thermal cutting operation fulfills the purpose of the invention.

BRIEF DESCRIPTION OF THE DRAWINGS

The accompanying drawing, which is included to provide a further understanding of the invention and is incorporated in and constitutes a part of this specification, illustrates a preferred embodiment of the invention and together with the detail description serves to explain the principles of the invention. In the drawing.

DETAILED DESCRIPTION OF THE INVENTION

Figure 1:
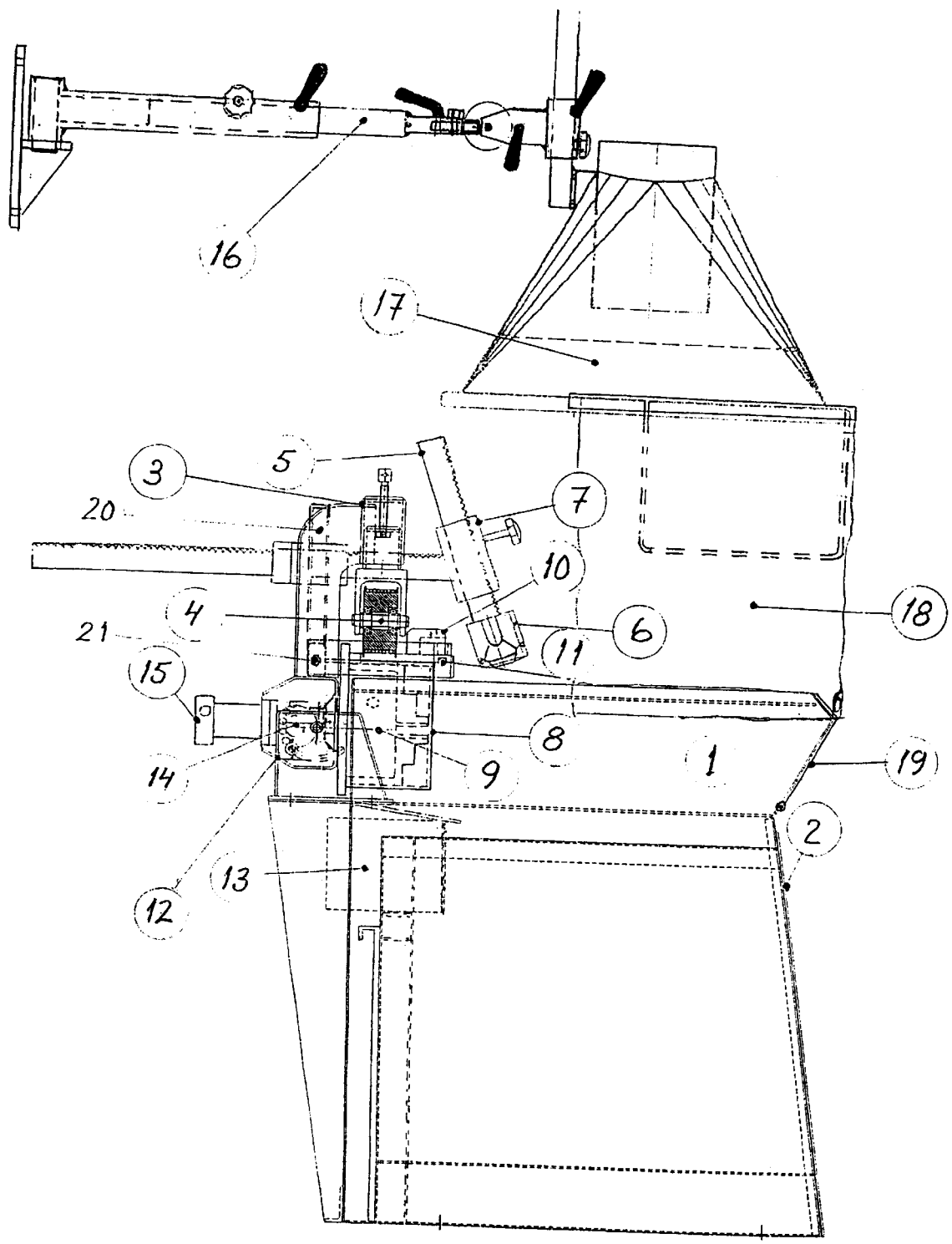
FIG. 1 is an illustrative layout of an arrangement for seam preparation according to the present invention.

Referring to FIG. 1, the circular movement is achieved by means of an electric motor 15 running an angular gear 14 which in its elongation (by way of a thorough shaft) transmits the movement to a work holding fixture 9 assembled on a work drive dog. The circular movement is used for seam preparation of pipes/tubes. Thanks to the use of a work holding fixture, the seam preparation can be done down to a length of 50 mm.

The linear movement is achieved by way of a driving wheel applied on the work holding fixture 9. On the feeding ring 8 and on a parallel conveying bar 21 respectively, rests a plate holder 10. The moment between the feeding ring 8 and the plate holder 10 is adjusted by a rubber-covered press roll 4. The linear movement is used for seam preparation of plates.

For the thermal cutting operation, use is made of a plasma aggregate which mixes the protective gases argon, nitrogen and hydrogen in order to provide cutes without oxidation to materials such as stainless steel and aluminum. For unalloyed and low-alloy materials, use is made of ordinary compressed air from existing plants.

Engine-driven gear racks 5 are applied on the machine in order to control the plasma gun 6 vertically and in the direction of the depth.

Exhaust from the machine is removed from two points: 1) through a suction casing 17 above the cutting area, and 2) through an outlet 13 in the lower part of the machine.

With this construction, the machine has a shape with few movable parts which implies that the machine obtains precision in the circular and in the linear movement. The movements can be adjusted steplessly when rotation speed of the driving unit has a working range of from 0.5 rpm up to 9 rpm. This results in an advancing speed for the plate holder 10 in between the range 0.35 m/min. Up to 6.3 m/min of stepless adjustment.

It has been shown in tests that the construction very well fulfills the great expectations and demands for precision and quality in connection with seam preparation.

What is claimed is:

1. A device for seam preparation of plates and pipes/tubes in which linear movements are provided for plates, and circular movements are provided for pipes/tubes, wherein the device comprises:

a work holding fixture on which at least one pipe/tube can be arranged for seam preparation, said work holding fixture being rotatable by an electric motor; and a plate holder on which a plate can be rigidly arranged for seam preparation.

2. The device for seam preparation according to claim 1, wherein the device further comprises:

a press roll arranged above said work holding fixture, whereby a linear movement is achieved by the work holding fixture which runs said plate holder, and also the press roll is arranged against the plate holder and the work holding fixture.

3. The device for seam preparation according to claim 1, wherein the movements providing the linear movement and circular movements are stepless.

4. A method of seam preparation using the device of claim 1, said method comprising utilizing a plasma cutting aggregate for providing cuts without oxidation in stainless steel and aluminum.

5. The device for seam preparation according to claim 1, wherein the circular movement is achieved by means of an electric motor;

said electric motor runs an angular gear which transmits the movement to a work holding fixture assembled on a work drive dog.

6. The device for seam preparation according to claim 1, wherein the linear movement is achieved by way of a driving wheel applied on the work holding fixture, and the plate holder rests on a feeding ring and on a parallel conveying bar respectively.

7. The device for seam preparation according to claim 1, wherein exhaust from the device is removed from two points through a suction casing above a cutting area and through an outlet in a lower part of the device.

8. The device for seam preparation according to claim 1, wherein engine-driven gear racks are applied on the device in order to control the movement of a plasma gun vertically.

* * * * *